(12) United States Patent
MacLachlan et al.

(10) Patent No.: US 10,464,755 B2
(45) Date of Patent: Nov. 5, 2019

(54) CONVEYOR ASSEMBLY WITH OFFSET BEARINGS

(71) Applicant: Laitram, L.L.C., Harahan, LA (US)

(72) Inventors: Gilbert J. MacLachlan, Harahan, LA (US); David C. Weiser, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/758,067

(22) PCT Filed: Oct. 5, 2016

(86) PCT No.: PCT/US2016/055464
§ 371 (c)(1),
(2) Date: Mar. 7, 2018

(87) PCT Pub. No.: WO2017/062432
PCT Pub. Date: Apr. 13, 2017

(65) Prior Publication Data
US 2018/0244472 A1    Aug. 30, 2018

Related U.S. Application Data

(60) Provisional application No. 62/238,926, filed on Oct. 8, 2015.

(51) Int. Cl.
*B65G 15/60* (2006.01)
*B65G 15/62* (2006.01)
*B65G 39/02* (2006.01)
*B65G 39/18* (2006.01)
*B65G 39/12* (2006.01)

(52) U.S. Cl.
CPC ............ *B65G 15/60* (2013.01); *B65G 15/62* (2013.01); *B65G 39/02* (2013.01); *B65G 39/12* (2013.01); *B65G 39/18* (2013.01); *B65G 2812/02019* (2013.01); *B65G 2812/0352* (2013.01)

(58) Field of Classification Search
CPC ......... B65G 15/60; B65G 15/62; B65G 39/02
USPC ...................................................... 198/837
See application file for complete search history.

(56) References Cited

U.S. PATENT DOCUMENTS

| 4,813,135 A | 3/1989 | Kuwica |
| 5,975,283 A | 11/1999 | Riffe |
| 6,170,648 B1 * | 1/2001 | Coxon ................ B65G 15/60 198/831 |
| 7,874,419 B2 * | 1/2011 | Hosch ................ B65G 21/06 198/837 |
| 2007/0039805 A1 * | 2/2007 | Fandella ............. B65G 17/40 198/779 |

(Continued)

OTHER PUBLICATIONS

Notification of the First Office Action of Chinese Application No. 201680054784.3, China National Intellectual Property Administration, dated May 28, 2019.

*Primary Examiner* — Gene O Crawford
*Assistant Examiner* — Lester Ill Rushin
(74) *Attorney, Agent, or Firm* — Catherine M. Bishop

(57) ABSTRACT

A noseroller assembly for transitioning a conveyor belt at an end of a carryway comprises offset bearings for guiding a conveyor belt. A first set of bearings protrudes slightly from the end of the noseroller substrate to guide the conveyor belt around the noseroller and a second set of bearings in recessed from the end of the noseroller substrate to prevent wear.

10 Claims, 8 Drawing Sheets

(56) References Cited

U.S. PATENT DOCUMENTS

2007/0144863 A1    6/2007   Yagi et al.
2009/0020397 A1    1/2009   Hosch et al.
2009/0260956 A1   10/2009   Dunn
2009/0277693 A1   11/2009   Verhaar

* cited by examiner

CONVEYOR ASSEMBLY WITH OFFSET BEARINGS

RELATED APPLICATIONS

The present application claims priority to U.S. Provisional Patent Application No. 62/238,926, filed Oct. 8, 2015 and entitled "Conveyor Assembly with Offset Bearings", the contents of which are herein incorporated by reference.

FIELD OF THE INVENTION

The present application relates to power-driven conveyors. More particular, the present invention relates to a noseroller assembly for transitioning a conveyor belt between a carryway and a returnway.

BACKGROUND OF THE INVENTION

Conveyor bells are widely used in various industries to convey products. Endless conveyor belts are generally trained around reversing elements, such as sprockets or noserollers, to form an endless circuit having a carryway and returnway. Modular plastic conveyor belts are constructed of a series of rows of side-by-side belt modules. Hinge eyes along opposite ends of each row interleave with hinge eyes of consecutive rows. A hinge rod inserted in the interleaved hinge eyes connects the rows together at hinge joints into an endless conveyor belt loop.

Certain modular plastic conveyor belts have difficulty going around noserollers or other reversing elements. The transition from the carryway to the returnway often causes vibrations and jolting in the modules, creating instability in the conveying surface. In addition, excessive wear on conveyor modules, caused by rubbing against the noseroller right before a transition point, can be a problem.

SUMMARY OF THE INVENTION

A noseroller assembly for a conveyor comprises bearings that are offset from each other. A first set of bearings protrudes slightly from the end of the noseroller substrate to guide the conveyor belt around the noseroller and a second set of bearings is recessed from the front end of the noseroller substrate to prevent wear.

According to one aspect, a noseroller assembly for transitioning a conveyor belt at an end of a carryway comprises a substrate having a rounded front edge, a first set of bearings rotatably mounted to the base and aligned along a first axis, and a second set of bearings rotatably mounted to the base and aligned along a second axis spaced from the first axis.

According to another aspect, a noseroller assembly comprises a substrate having a rounded front edge, a first opening in the substrate for rotatably mounting a bearing and a first bearing mounted in the first opening such that the front surface of the first bearing is recessed from the rounded front edge.

According to another aspect, a noseroller assembly for a conveyor belt comprises a first bearing module having an upper surface, a first side edge, a second side edge, a rounded front edge, a rear edge, a bottom and an opening in the upper surface for receiving a bearing, a first bearing mounted in the opening of the first bearing module, a second bearing module adjacent the first bearing module having an upper surface, a first side edge adjacent the second side edge of the first bearing module, a second side edge, a rounded front edge, a rear edge, a bottom and an opening in the upper surface for receiving a bearing, a second bearing mounted in the opening of the second module and a connector for connecting the first bearing module and the second bearing module so that the rounded front edges align with each other.

According to another aspect, a conveyor belt module comprises a module body extending from a top surface to a bottom surface, laterally from a first side edge to a second side edge and longitudinally from a first end to a second end, a plurality of spaced-apart hinge elements extending from the first end and the second end and a plurality of bearing pockets formed in the bottom surface for accommodating a noseroller assembly having bearings.

BRIEF DESCRIPTION OF THE FIGURES

These features and aspects of the invention, as well as its advantages, are better understood by referring to the following description, appended claims, and accompanying drawings, in which:

DETAILED DESCRIPTION OF THE INVENTION

A conveyor assembly employs offset bearings to facilitate transitioning of a conveyor belt around a noseroller or other element in a conveyor. The invention will be described below relative to certain illustrative embodiments, though those skilled in the art will recognize that the invention is not limited to the described embodiments.

Figure 1:
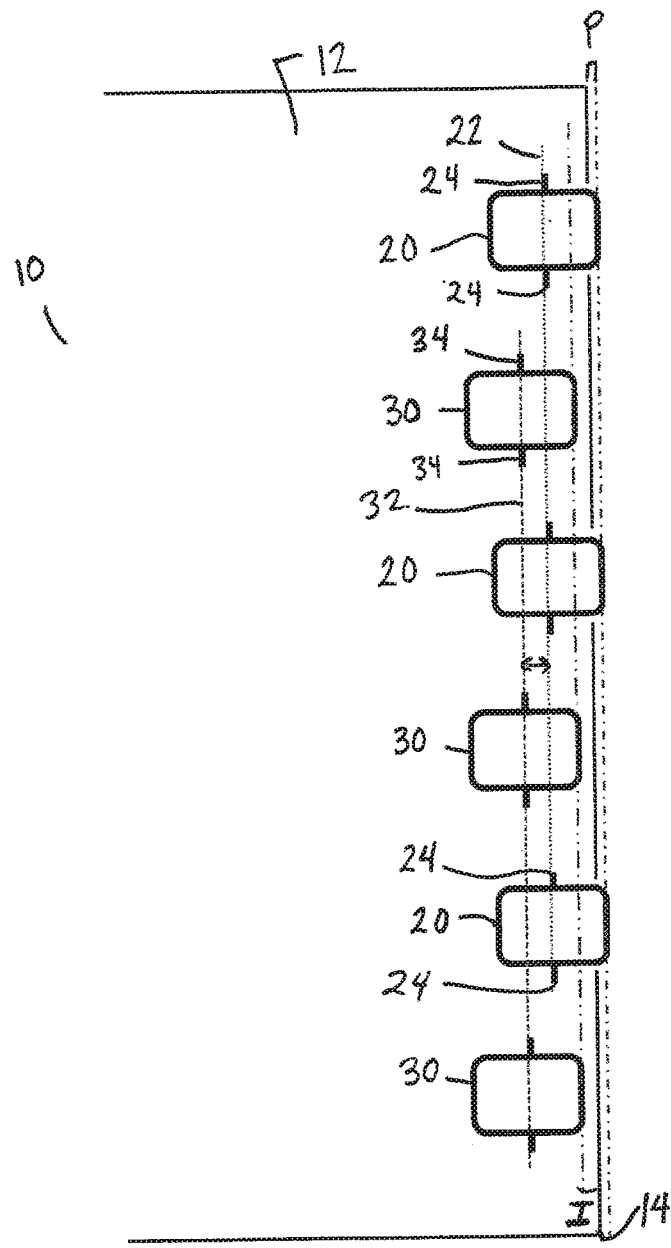
FIG. 1 is a schematic overhead view of a noseroller for a conveyor assembly including offset bearings, according to an embodiment of the invention.

FIG. 1 shows an embodiment of a noseroller assembly 10 having offset bearings. The noseroller assembly 10 guides a conveyor belt at one end of a carryway to or from a returnway. The noseroller assembly 10 includes a base portion 12 having an upper surface upon which a conveyor belt rides and a curved front edge 14 marking the end of a carryway for the conveyor belt. Bearings are mounted in the roller assembly 10 to reduce friction between the conveyor belt and noseroller base portion 12 and facilitate operation of a conveyor belt. The illustrative noseroller assembly 10 includes at least two sets of bearings: a first set of aligned bearings 20 and a second set of aligned bearings 30 offset from (unaligned with) the first set. The illustrative first set (forward set) comprises three bearings 20, mounted to the base portion 12 and rotatable about axles 24. The first axles 24 align along first lateral axis 22. The outer surfaces of the bearing 20 in the first set extend past the edge 14 by a selected distance P.

The bearings 30 in the second set (rear set) are aligned along a second lateral axis 32 forming the axis of rotation for the bearings 30. The axles 34 for the second bearings 30 align with the second lateral axis 32. The second lateral axis 32 is spaced from the first lateral axis 22 by a selected distance D. In the illustrative embodiment, the outermost surfaces of the bearings 30 are recessed (inset) from the edge 14 by a distance I. The top surfaces of the bearings 20 and 30 are flush with the upper surface of the base portion 12 to contact a conveyor belt riding over the noseroller assembly.

In the illustrative embodiment, the bearings are staggered, with the bearings 20 in the first set alternating with the bearings 30 in the second set. Alternatively, the bearings may have any suitable pattern, such as two aligned, adjacent first bearings 20 that protrude from the edge 14 then an unaligned, recessed second bearing 30, then two aligned, adjacent protruding first bearings 20, and so on.

The bearings 20 in the first set contact the bottom of a conveyor belt to transition the conveyor belt around the noseroller assembly 10.

The bearings 30 in the second set at the second location contact the conveyor belt before the transition point at edge 14 to reduce wear. The second bearings 30 facilitate smooth operation of the conveyor belt and extend the lifetime of the belt by reducing wear. The second, recessed bearings 30 can be a different size than the protruding bearings 20 or the same size.

Figure 2:
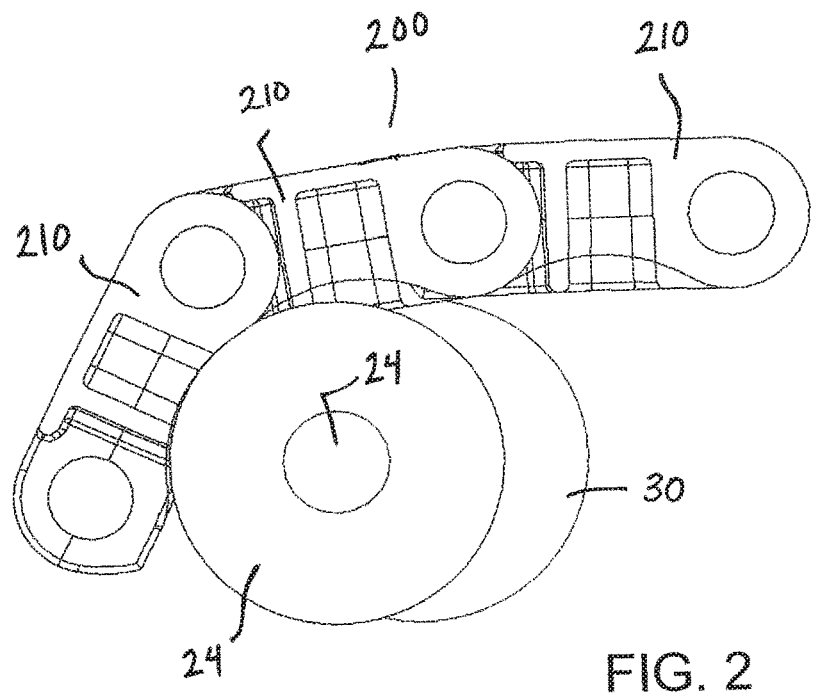
FIG. 2 is a side view of a conveyor belt passing over two offset bearings in a noseroller assembly of an embodiment of the invention.

FIG. 2 is a side schematic view of a conveyor belt 200 transitioning around a noseroller assembly including unaligned bearings 20, 30. The illustrative conveyor belt 200 is a modular plastic conveyor belt formed of a plurality of linked modules 210, but the invention is not so limited. As shown, a second bearing 30 is spaced inwards from a first bearing 20. The second bearing 30 is used to prevent wear and the first bearing 20 guides the conveyor belt around a noseroller substrate.

Figure 3:
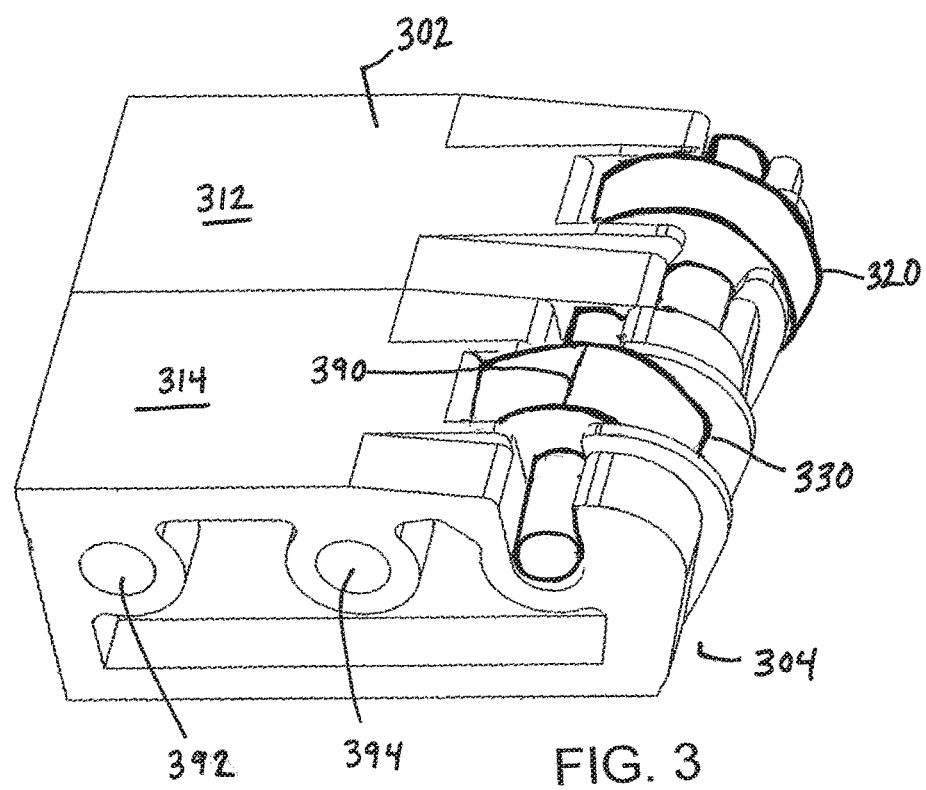
FIG. 3 is an isometric view of a portion of a noseroller assembly including offset bearings according to another embodiment of the invention.

In one embodiment of the invention, a noseroller assembly may comprise a plurality of bearing-carrying modules stacked together. FIG. 3 shows a portion of a noseroller assembly including side-by-side bearing modules 302, 304. A first module 302 comprises a base substrate 312 and openings for receiving a first bearing 320. The first bearing protrudes slightly from the front edge of the module, forming part of a forward set of bearings. The second module 304 includes openings for receiving a second bearing 330. The second bearing 330 is recessed from the front edge of the modules and is offset from the first bearing 320 when the bearing modules 302, 304 are adjacent to each other. Any number and combination of bearing modules may be stacked together to form a noseroller assembly. Any suitable means can be used to couple the modules together.

Figure 4:
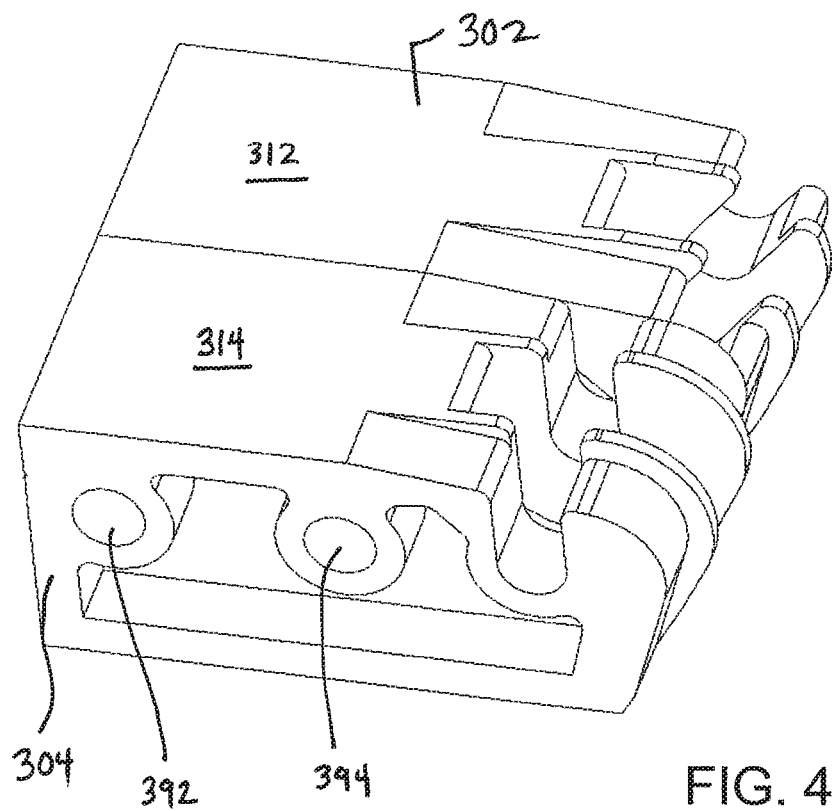
FIG. 4 shows the portion of a noseroller assembly of FIG. 3 with the bearings removed.
Figure 5:
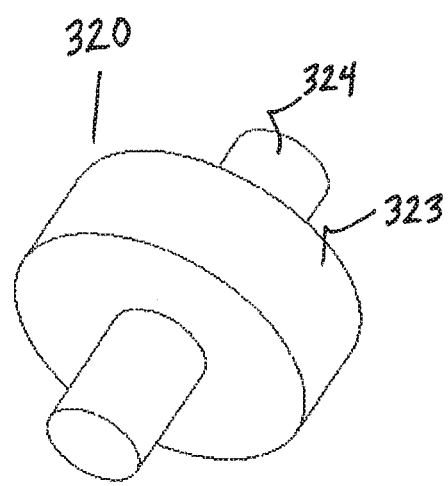
FIG. 5 is an isometric view of a bearing suitable for use with the roller assembly of FIGS. 3 and 4.

FIG. 4 shows the noseroller assembly of FIG. 3 with the bearings removed. FIG. 5 shows an example of a bearing 320 suitable for use with either of the modules 302, 304.

Figure 6:
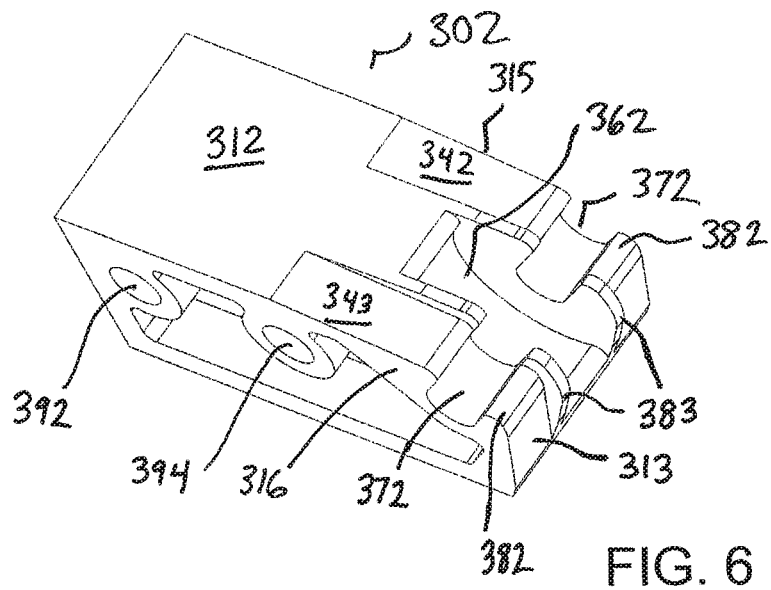
FIG. 6 is an isometric view of a first bearing module of the portion of the noseroller assembly of FIG. 3.
Figure 7:
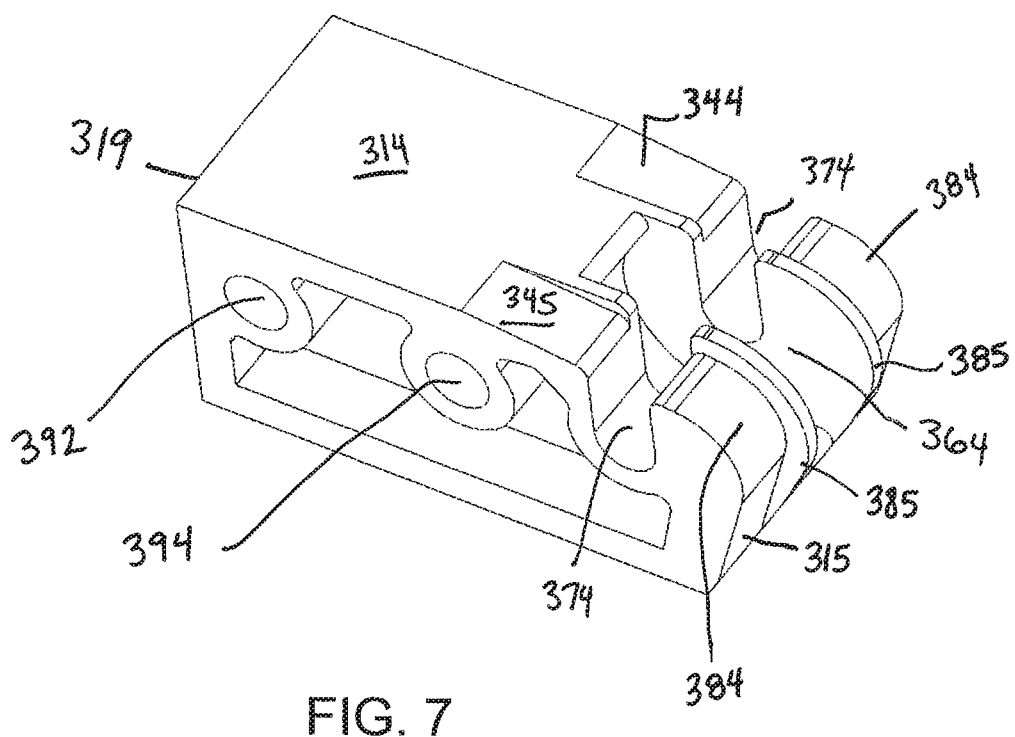
FIG. 7 is an isometric view of a second bearing module of the noseroller assembly of FIG. 3.

FIG. 6 shows the first module 302 alone and FIG. 7 shows the second module 304 alone. Multiple of the first modules 302 and second modules 304 can be coupled together in any suitable pattern and number to form a noseroller for a conveyor.

The first module 302, which houses a bearing positioned to protrude from the front edge of the noseroller assembly to contact and guide a conveyor belt around the noseroller front edge, includes a top surface 312. The top surface contacts a conveyor belt riding over the noseroller. Sloping recesses 342, 343 extend forward from the top surface 312 at the side edges of the module to provide clearance for a conveyor belt. A bearing slot 362 is formed in the upper surface 312, between the sloping recesses 342, 343, starting about halfway down the sloping recesses 342, 343 and extending to the front edge 313 of the module 302. An axle slot 372 intersects the bearing slot 362. The illustrative axle slot 372 is formed at the front ends of the sloping recesses 342, 343 and extends from one side 315 of the module to the second side 316. The illustrative axle slot 372 extends at an angle (non-perpendicular) relative to the top surface 312 and forms rounded tips 382 at the top of the front edge 313. The rounded tips 382 are transition surfaces. The side walls of the bearing slot 362 extend past the front edge 313 and above the rounded tips 382 to form rounded lips 383.

To assemble a first module 302, a simple bearing 320, comprising a central hub 323 and axles 324 extend from the central hub 323, is inserted in the slots 362, 372. The axles 324 pass through the axle slot 372 and are held in place by gravity. The central hub 373 of the bearing is held in the bearing slot 362 such that the forwardmost portion of the central hub 373 protrudes beyond and above the rounded lips 383. A conveyor belt traveling over the module will contact the bearing surface rather than the surfaces 384, 385 or 315. The first, protruding bearing 320 is thus positioned to facilitate the transition about the end of the noseroller assembly.

Referring to FIG. 7, the second module 304 is configured to prevent wear in the conveyor belt caused by contact with the noseroller assembly. For this reason, the second module 304 positions a bearing in a different location than the first module 302. The second module 304 includes a top surface 314, sloping recesses 344, 445 in the top surface 314, a bearing slot 364 and an axle slot 374. The axle slot 374 is substantially vertical, instead of angled, though the invention is not so limited. The sloping recesses 344, 345 are shorter than the sloping recesses 342, 343 of the first module 302, placing the bearing slots 364 closer to the back 329 of the module 304. Curved transition surfaces 384 between the axle slot 374 and the front edge 315 of the module 304 are larger than the rounded tips 382 in the first module 302, because the axle slot 374 is set farther back from the front edge 315 in the second module 304 than the axle slot 372 in the first module 302. The second module 304 also includes rounded lips 385 between the front of the bearing slot 364 and the curved transition surfaces 384. The rounded lips 385 taper in the front of the module.

As shown in FIG. 3, the modules 302, 304 are configured to place bearings so that bearing 320 protrudes slightly beyond the front edge of the assembly, while bearing 330 is slightly recessed and setback from the front edge. The bearing 330 contacts the underside of a conveyor belt at a location 390, slightly above the top surface 314, to reduce wear in the conveyor belt.

The bearing modules 302, 304 also include connection means for connecting two or more modules together, in any suitable combination, to form a noseroller assembly. In the illustrative embodiment, each module includes rod openings 392, 394 between the top surface and bottom of the modules and extending from one side of the module to the other. The rod openings 392, 394 align with each other for form a rod-receiving passageway. A connecting rod may be inserted the rod-receiving passageway to connect two modules 302, 304 together in a particular orientation. Any suitable means for connecting two or more modules together may be used.

Figure 8:
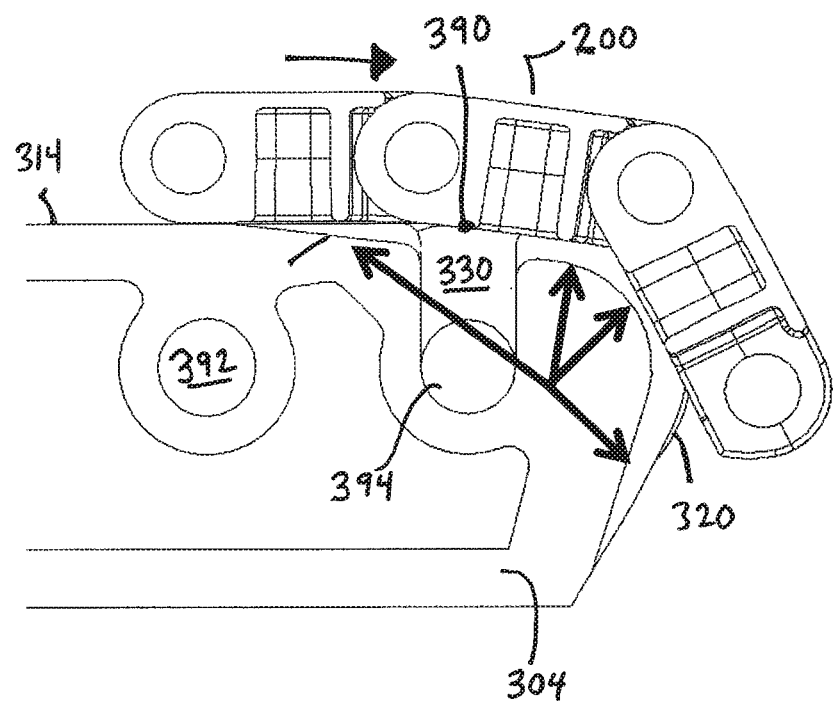
FIG. 8 is a side view of a conveyor belt passing over a noseroller assembly having offset bearings according to an embodiment of the invention.

FIG. 8 shows a modular plastic conveyor belt 200 going over noseroller assembly comprising at least two modules (module 304 with recessed bearing shown) having unaligned bearings. The recessed bearing 330 contacts the conveyor belt first, at location 390, lifting the belt slightly above the top surfaces 312, 314 to prevent or reduce wear. Then, the protruding bearing 320 at the nose of the noseroller assembly guides the belt around the nose and into the returnway. The arrows show clearance between the noseroller substrate and the bottom of the belt 200.

The bearings 320, 330 can be dropped into the respective slots and held in place by the weight of the belt and-or gravity, or through any suitable means.

Figure 9:
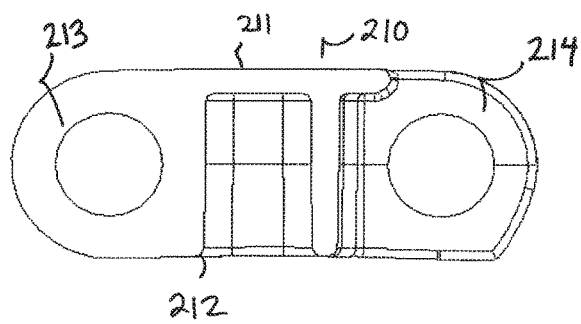
FIG. 9 is a side view of a conveyor belt module suitable for use with a noseroller assembly of an embodiment of the invention.
Figure 10:
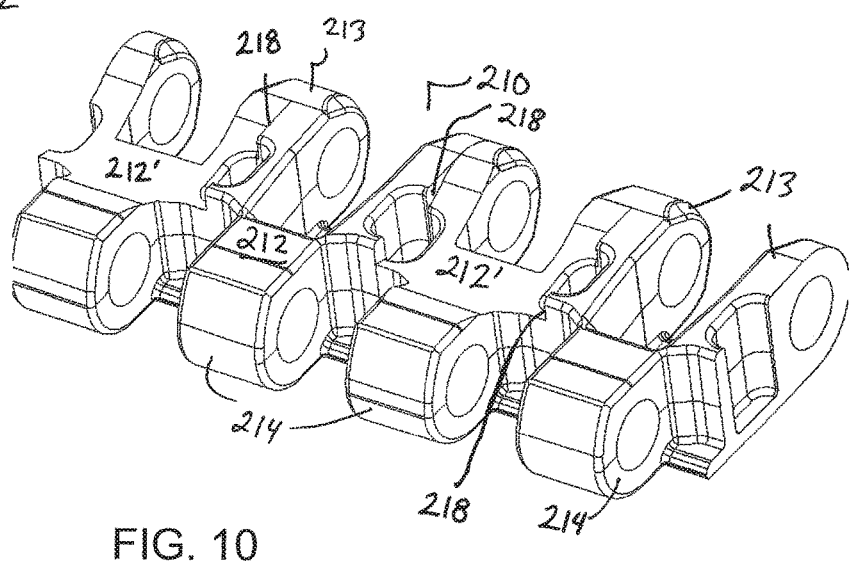
FIG. 10 is an isometric bottom view of the conveyor belt module of FIG. 9.

The conveyor belt 200 may be configured to accommodate a noseroller assembly with unaligned bearings. FIGS. 9 and 10 show an embodiment of a conveyor belt module 210 suitable for use with a noseroller assembly with offset bearings. The module includes a module body having a top conveying surface 211, a bottom surface 212 and hinge elements 213, 214 for connecting the module to adjacent modules the conveyor belt. The bottom surface 212 may be shaped to accommodate the bearings 320, 330 on the noseroller assembly. The illustrative module 210 includes bearing pockets formed by recesses 212' in the bottom surface 212. The recesses are defined by sidewalls 218 which form a track for receiving the bearing. The recesses are curved, though the rest of the bottom surface 212 is flat.

Figure 11:
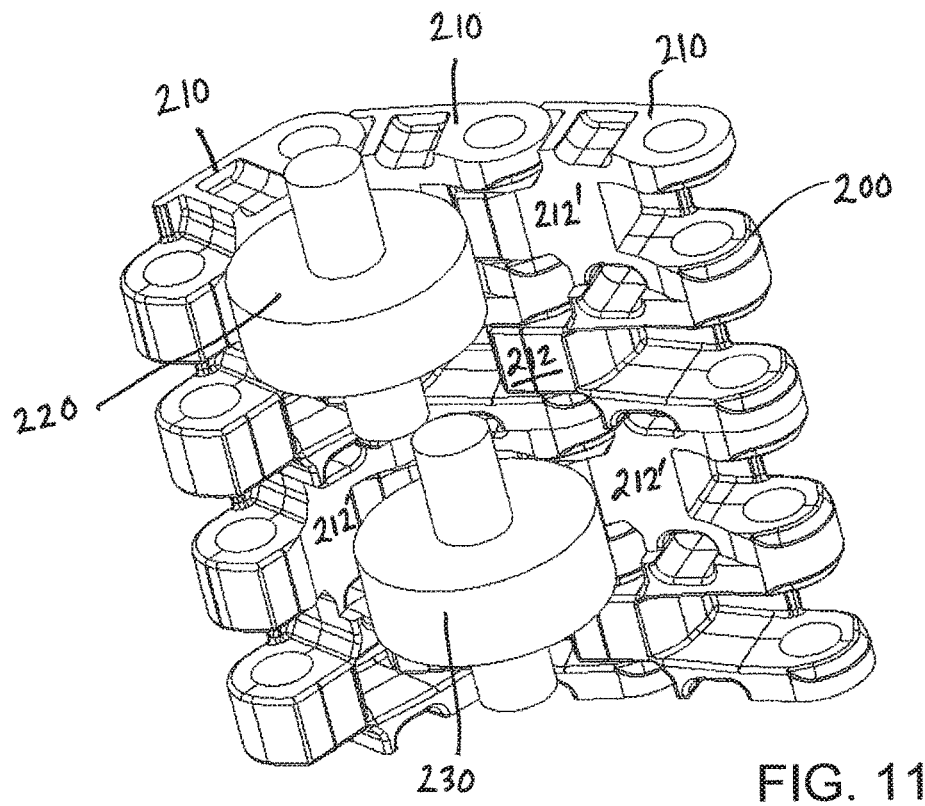
FIG. 11 is a schematic bottom view of a conveyor belt formed of modules shows in FIG. 9 passing over offset bearings.
Figure 12:
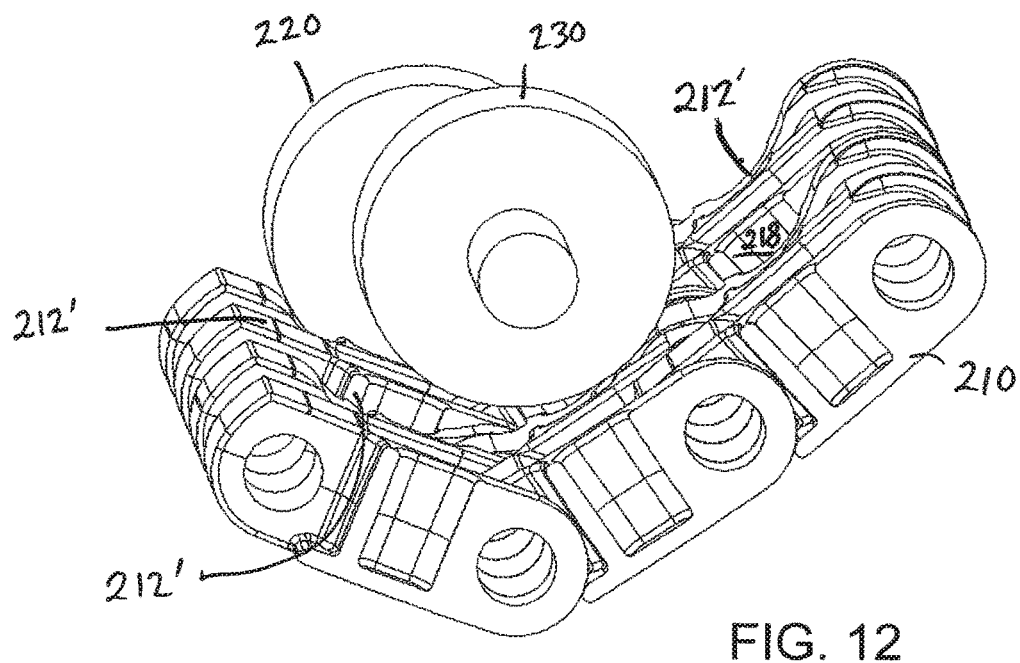
FIG. 12 is a side view of the assembly of FIG. 11.

FIGS. 11 and 12 schematically show a portion of a conveyor belt 200 formed by modules 210 going over offset bearings 220, 230 in a noseroller assembly. The recesses 212' in the bottom surface 212 of the modules receive the bearings 320 or 330 to facilitate transition of the conveyor belt 200 around the noseroller assembly.

Figure 13:
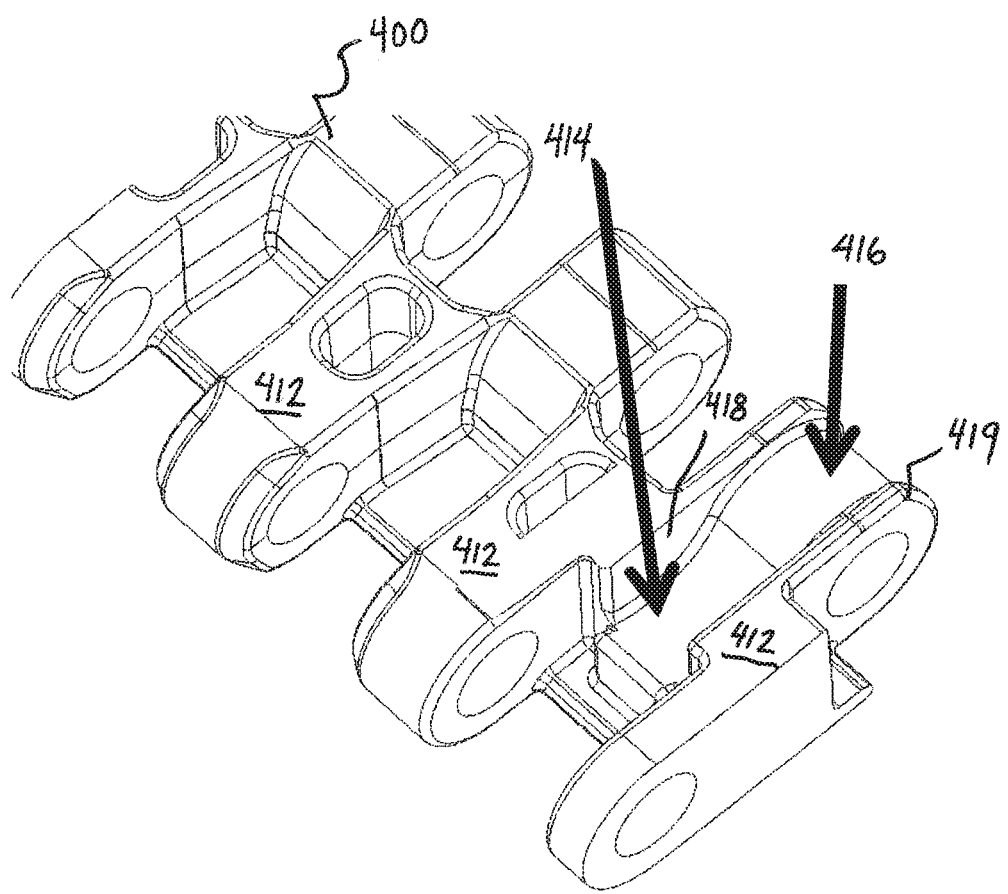
FIG. 13 shows another embodiment of a conveyor belt module including bottom recesses for accommodating bearings.

FIG. 13 shows another embodiment of a conveyor belt module 400 including at least one bearing pocket 414 in an otherwise flat bottom surface 412 to accommodate a bearing in a noseroller assembly. The recess forming the bearing pocket 414 is deeper than the recess 212' and forms a channel 416 in the hinge element 419 for tracking a bearing.

The invention has been described relative to certain illustrative embodiments, but the scope of protection is not limited to these illustrative embodiments.

What is claimed is:

1. A noseroller assembly for transitioning a conveyor belt at an end of a carryway, comprising:
a substrate having an upper surface upon which the conveyor belt rides and a rounded front edge marking the end of the carryway;
a first set of bearings rotatably mounted to the substrate and rotatable about axles aligned along a first lateral axis, the first set of bearings having outer surfaces that protrude beyond the rounded front edge by a first selected distance; and
a second set of bearings rotatably mounted to the substrate and rotatable about axles aligned along a second lateral axis spaced from the first axis, the second set of bearings alternating with bearings in the first set and having outer surfaces that are recessed from the rounded front edge by a second selected distance, wherein the first set of bearings and the second set of bearings have top surfaces that are substantially flush with the upper surface of the substrate.

2. The noseroller assembly of claim 1, wherein the substrate comprises a first module including an opening for a bearing in the first set and a second module including an opening for a bearing in the second set, the first module coupled to the second module.

3. The noseroller assembly of claim 1, wherein the upper surface of the substrate includes openings for receiving the bearings.

4. The noseroller assembly of claim 3, wherein the upper surface includes sloping recesses adjacent the openings.

5. A noseroller assembly, comprising:
a substrate having a top surface, a pair of sloping recesses extending forward from the top surface at side edges of the substrate, and a rounded front edge;
a first bearing slot in the substrate between the pair of sloping recesses for rotatably mounting a bearing;
a substantially vertical axle slot intersecting the first bearing slot for receiving axle of the bearing;
rounded lips between the first bearing slot and the rounded front edge, the rounded lips extending past the rounded front edge; and
a first bearing mounted in the first bearing slot such that the front surface of the first bearing is recessed from the rounded front edge, wherein the first bearing has an axle received in the substantially vertical axle slot.

6. The noseroller assembly of claim 5, further comprising:
a second bearing slot in the substrate; and
a second bearing rotatably mounted in the second bearing slot.

7. The noseroller assembly of claim 6, wherein the second bearing protrudes past the rounded front edge.

8. The noseroller assembly of claim 5, wherein the substrate comprises a plurality of modules coupled together, each module including a bearing slot and a bearing mounted in the bearing slot.

9. A noseroller assembly for a conveyor belt, comprising:
a first bearing module having an upper surface, a first side edge, a second side edge, a rounded front edge, a rear edge, a bottom and an opening in the upper surface for receiving a bearing;
a first bearing mounted in the opening of the first bearing module and protruding past the rounded front edge by a first selected distance;
a second bearing module adjacent the first bearing module having an upper surface, a first side edge adjacent the second side edge of the first bearing module, a second side edge, a rounded front edge, a rear edge, a bottom and an opening in the upper surface for receiving a bearing;
a second bearing mounted in the opening of the second module and recessed from the rounded front edge by a second selected distance; and
a connector for connecting the first bearing module and the second bearing module so that the rounded front edges align with each other.

10. The noseroller assembly of claim 9, wherein the connector comprises a rod inserted in aligned rod-receiving openings formed between the upper surfaces and bottoms of the first bearing module and the second bearing module.

* * * * *